(12) United States Patent
Cooke

(10) Patent No.: US 11,360,639 B2
(45) Date of Patent: Jun. 14, 2022

(54) MEDIA CONTENT PLANNING SYSTEM

(71) Applicant: SpaceDraft Pty Ltd, Mosman Park (AU)

(72) Inventor: Lucy Cooke, Nedlands (AU)

(73) Assignee: SpaceDraft Pty Ltd, Mosman Park (AU)

( * ) Notice: Subject to any disclaimer, the term of this patent is extended or adjusted under 35 U.S.C. 154(b) by 0 days.

(21) Appl. No.: 17/030,161

(22) Filed: Sep. 23, 2020

(65) Prior Publication Data

US 2021/0004143 A1   Jan. 7, 2021

Related U.S. Application Data

(63) Continuation of application No. PCT/AU2019/050274, filed on Mar. 27, 2019.

(30) Foreign Application Priority Data

Mar. 27, 2018 (AU) ................................ 2018901016

(51) Int. Cl.
*G06F 3/0481* (2022.01)
*G06F 3/0484* (2022.01)
(Continued)

(52) U.S. Cl.
CPC ...... *G06F 3/04817* (2013.01); *G06F 3/04842* (2013.01)

(58) Field of Classification Search
CPC .................... G06F 3/04817; G06F 3/04842
See application file for complete search history.

(56) References Cited

U.S. PATENT DOCUMENTS 8,443,284 B2 *  5/2013  Lindley ................... G06T 19/00
                                                                  715/848
8,606,611 B1 * 12/2013  Fedorov ............... G06Q 10/103
                                                                  705/7.15
(Continued)

FOREIGN PATENT DOCUMENTS

WO       9742601 A1      11/1997
WO    2006053271 A1       5/2006
WO    2014169692 A1      10/2014

OTHER PUBLICATIONS

International Search Report and Written Opinion dated May 7, 2019 in International Patent Application No. PCT/AU2019/050274. 11 pages.

(Continued)

*Primary Examiner* — Daeho D Song
(74) *Attorney, Agent, or Firm* — Kilpatrick Townsend & Stockton LLP

(57) ABSTRACT

A system comprises a data storage device arranged to store information indicative of scenes of a media content project, and a user interface (UI). The UI is arranged to display information indicative of scenes of a media content project and, for a scene, to facilitate display of a representation of an observer and display of information indicative of an observer experience associated with the scene at a location relative to the observer representative of a desired location of the observer experience in the scene. The UI is arranged, for a scene, to facilitate selection of an observer experience to be associated with the scene and selection of a location of the observer experience relative to the observer. The system is arranged to store a data record indicative of the selected observer experience, the scene associated with the observer experience, and the location of the observer experience relative to the observer.

19 Claims, 12 Drawing Sheets

(51) Int. Cl.
*G06F 3/04817* (2022.01)
*G06F 3/04842* (2022.01)

(56) References Cited

U.S. PATENT DOCUMENTS

| | | | | |
|---|---|---|---|---|
| 10,235,808 | B2* | 3/2019 | Chen | G02B 27/0172 |
| 10,602,200 | B2* | 3/2020 | Grant | G06F 3/0346 |
| 2008/0300053 | A1* | 12/2008 | Muller | G06F 40/166 |
| | | | | 463/31 |
| 2009/0113305 | A1* | 4/2009 | Graif | G09B 29/008 |
| | | | | 715/727 |
| 2009/0219291 | A1 | 9/2009 | Lloyd et al. | |
| 2009/0295918 | A1* | 12/2009 | Horovitz | G06F 3/04817 |
| | | | | 348/143 |
| 2011/0161837 | A1* | 6/2011 | Betzler | G06Q 10/10 |
| | | | | 715/757 |
| 2011/0195723 | A1* | 8/2011 | Kim | G06F 3/0484 |
| | | | | 455/566 |
| 2011/0210962 | A1* | 9/2011 | Horan | G06T 19/003 |
| | | | | 715/757 |
| 2012/0050257 | A1* | 3/2012 | Clarke | G06F 16/972 |
| | | | | 707/769 |
| 2012/0198319 | A1* | 8/2012 | Agnoli | G11B 27/34 |
| | | | | 715/202 |
| 2014/0160320 | A1* | 6/2014 | Babale | H04N 5/2621 |
| | | | | 348/239 |
| 2014/0258854 | A1* | 9/2014 | Li | H04N 21/4858 |
| | | | | 715/702 |
| 2015/0145435 | A1* | 5/2015 | Ogawa | H05B 47/155 |
| | | | | 315/294 |
| 2015/0235447 | A1* | 8/2015 | Abovitz | G01B 11/303 |
| | | | | 345/633 |
| 2015/0309264 | A1* | 10/2015 | Abovitz | G02B 6/32 |
| | | | | 385/33 |
| 2015/0378707 | A1* | 12/2015 | Park | G06F 3/0482 |
| | | | | 717/174 |
| 2016/0034240 | A1* | 2/2016 | Kreiner | G09G 5/003 |
| | | | | 348/383 |
| 2016/0182971 | A1* | 6/2016 | Ortiz | H04N 21/42224 |
| | | | | 725/34 |
| 2016/0227262 | A1* | 8/2016 | Grant | H04N 21/8545 |
| 2016/0330522 | A1* | 11/2016 | Newell | G06F 21/604 |
| 2017/0076499 | A1* | 3/2017 | Jiang | G06T 7/00 |
| 2017/0270711 | A1* | 9/2017 | Schoenberg | G06T 19/006 |
| 2018/0095649 | A1* | 4/2018 | Valdivia | G06F 3/0346 |
| 2018/0096505 | A1* | 4/2018 | Valdivia | G06F 3/017 |
| 2018/0096532 | A1* | 4/2018 | Srivastav | G01C 23/00 |
| 2018/0277161 | A1* | 9/2018 | Eronen | H04N 21/44008 |
| 2019/0265945 | A1* | 8/2019 | Newell | G06F 3/04842 |
| 2020/0201036 | A1* | 6/2020 | Hong | G02B 27/0101 |

OTHER PUBLICATIONS

International Preliminary Report on Patentability dated Jul. 9, 2020 in International Patent Application No. PCT/AU2019/050274. 85 pages.
International—Type Search Report dated Dec. 6, 2018 in AU Patent Application 2018901016. 22 pages.
Extended European Search Report dated Jun. 25, 2021 in EP Application No. 19777521.6. 9 pages.
Unity Technologies; "Unity 2017.1—Manual: Timeline overview"; 2017; Retrieved from the Internet: https://docs.unity3d.com/2017.1/Documentation/Manual/TimelineOverview.html; retrieved on Jun. 11, 2021; 4 total pages.
Pohl, Brian J.; "HALON evolves previs with Unreal Engine"; Aug. 29, 2017; Retrieved from the Internet: https://www.unrealengine.com/en-US/developer-interviews/halon-evolves-previs-with-unreal-engine; retrieved on Jun. 11, 2021; 9 total pages.
jschap1; "How to Make a Simple Game in Unity 3D"; Dec. 29, 2014; Retrieved from the Internet: https://www.instructables.com/How-to-make-a-simple-game-in-Unity-3D/; retrieved on Jun. 8, 2021; 14 total pages.

* cited by examiner

MEDIA CONTENT PLANNING SYSTEM

CROSS-REFERENCES TO RELATED APPLICATIONS

This application is a continuation application of International Patent Application No. PCT/AU2019/050274 entitled "A MEDIA CONTENT PLANNING SYSTEM," filed on Mar. 27, 2019, which claims priority to Australian Patent Application No. 2018901016, filed on Mar. 27, 2018, all of which are herein incorporated by reference in their entirety for all purposes.

FIELD OF THE INVENTION

The present invention relates to a media content planning system. The content planning system has particular application for virtual reality, augmented reality and mixed reality content, and video game development.

BACKGROUND OF THE INVENTION

In the creation of video content, such as a movie, it is desirable to conceptualise and plan the movie prior to creating the movie as this is cheaper than creating the movie to later determine that the story associated with the movie does not actually work. Typically, this 'pre-visualization' step is achieved by first building a 'blueprint' of the movie using a script and/or a computer-generated animation.

However, it is difficult for creators of virtual reality (VR), augmented reality (AR) and mixed reality (MR) content to appropriately conceptualise and plan VR/AR/MR content because observer experiences typically do not occur at defined times, are typically dependent on the observer location which is controlled by a user, and can emanate from any location relative to the observer.

SUMMARY OF THE INVENTION

In accordance with a first aspect of the present invention, there is provided a media content planning system comprising:
a data storage device arranged to store information indicative of scenes of a media content project;
a user interface arranged to:
display scene indicia indicative of locations of scenes of a media content project and/or respective timings of occurrence of the scenes in the media content project;
enable a user to select an experience space for display, the experience space associated with a defined time and including a representation of an observer;
enable the user to select at least one experience icon indicative of an observer experience associated with the scene;
enable the user to select a location on the experience space at which to dispose each experience icon, and to display each experience icon on the experience space at the respective selected location in response to selection of a location on the experience space for each experience icon, each selected location representative of a desired location in at least 2 dimensional space relative to the observer of an observer experience in the scene at the defined time;
enable the user to select at least one further experience space for display, each further experience space associated with a further defined time corresponding to a later time in the scene than the defined time;
enable the user to select a further location on the experience space at which to dispose an experience icon, and to display the experience icon on the further experience space at the selected further location in response to selection of a further location on the further experience space, the selected further location representative of a desired further location in at least 2 dimensional space relative to the observer of the observer experience associated with the experience icon at the further defined time; and
the system arranged to store data indicative of:
the or each selected observer experience;
the scene associated with each observer experience, and for each experience space, the selected location in at least 2 dimensional space relative to the observer of each observer experience relative to the observer.

The system may be arranged to facilitate selection by a user of an open world project or a closed world project.

For an open world project, the system may be arranged to facilitate selection by a user of a journey open world project or a free roaming open world project.

In an embodiment, the media content is a closed world project and the user interface is arranged to facilitate selection by a user of scenes to form part of the media content and the order of presentation of the scenes to an observer. The user interface may also be arranged to facilitate selection by a user of the timing of presentation of scenes of the media content.

In an embodiment, the media content is an open world project and the user interface is arranged to facilitate selection by a user of scenes to form part of the media content.

In an embodiment, the system is arranged to display a world overview, the world overview comprising a world space including at least one scene icon indicative of at least one scene at a location on the world space representative of the desired location of the scene in the media content.

In an embodiment, the world space comprises a defined shape to represent a world overview.

In an alternative embodiment, the world space is defined according to a computer-generated space mesh. The space mesh may represent an actual real-world space, and the space mesh may be generated using a LIDAR, matterport scanner or any other scanning device.

In an embodiment, the system enables the user to add a scene icon to the world space at a location representative of the desired location of a scene in the media content, and to enable the user to select at least one observer experience for association with the scene icon.

In an embodiment, the system enables the user to select the type of observer experience associated with the experience icon.

In an embodiment, the experience space comprises at least one annular portion surrounding the representation of the observer, the annular portion usable by the user to add an experience icon to the experience space at a location in 2 dimensional space relative to the observer representative of the desired location in at least 2 dimensional space of an observer experience in the scene.

In an embodiment, the experience space comprises a sphere surrounding the representation of the observer, the sphere usable by the user to add an experience icon to the experience space at a location in 3 dimensional space relative to the observer representative of the desired location in at least 2 dimensional space of an observer experience in the scene.

In an embodiment, the system is arranged to enable a user to add notes to a scene.

In an embodiment, the system is arranged to enable a user to add a representative image to the media content project. The representative image may be a 360° image or a 2D image.

In an embodiment, the system is arranged to enable a user to select a point of view for the media content project.

In an embodiment, the system is arranged to enable a user to:
create a plurality of characters; and
create observer experience data for each character.

In an embodiment, the system is arranged to enable a user to share the media content project with a selected other user.

In an embodiment, the observer experience includes any one or more of a haptic experience, a visual experience and/or an audio experience.

In an embodiment, the system includes a user interface device and a remote computing device in communication with the user interface device.

In an embodiment, the remote computing device comprises a server arranged to serve data indicative of the user interface to the user interface device. The data indicative of the user interface may comprise data indicative of web pages.

The observer experience data may be stored at the remote computing device and/or at the user interface device.

In an embodiment, the user interface device includes a head mounted device (HMD) that may include a tool that supports WebVR.

In accordance with a second aspect of the present invention, there is provided a method of planning media content, the method comprising:
storing information indicative of scenes of a media content project;
displaying scene indicia indicative of locations of scenes of the media content project and/or respective timings of occurrence of the scenes in the media content project;
enabling a user to select scene indicia representative of a scene;
enabling the user to select an experience space for display, the experience space associated with a defined time and including a representation of an observer;
enabling the user to select at least one experience icon indicative of an observer experience associated with the scene;
enabling the user to select a location on the experience space at which to dispose each experience icon, and to display each experience icon on the experience space at the respective selected location in response to selection of a location on the experience space for each experience icon, each selected location representative of a desired location in at least 2 dimensional space relative to the observer of an observer experience in the scene at the defined time;
enabling the user to select at least one further experience space for display, each further experience space associated with a further defined time corresponding to a later time in the scene than the defined time;
enabling the user to select a further location on the experience space at which to dispose an experience icon, and to display the experience icon on the further experience space at the selected further location in response to selection of a location on the further experience space, the selected location representative of a desired further location in at least 2 dimensional space relative to the observer of the observer experience associated with the experience icon at the further defined time;
storing data indicative of:
the or each selected observer experience;
the scene associated with each observer experience, and
for each experience space, the selected location in at least 2 dimensional space relative to the observer of each observer experience relative to the observer.

In accordance with a third aspect of the present invention, there is provided a user interface for a system for planning media content, the user interface arranged to:
display scene indicia indicative of locations of scenes of a media content project and/or respective timings of occurrence of the scenes in the media content project;
enable a user to select an experience space for display, the experience space associated with a defined time and including a representation of an observer;
enable the user to select at least one experience icon indicative of an observer experience associated with a scene; and
enable the user to select a location on the experience space at which to dispose each experience icon, and to display each experience icon on the experience space at the respective selected location in response to selection of a location on the experience space for each experience icon, each selected location representative of a desired location in at least 2 dimensional space relative to the observer of an observer experience in the scene at the defined time;
enable the user to select at least one further experience space for display, each further experience space associated with a further defined time corresponding to a later time in the scene than the defined time; and
enable the user to select a further location on the experience space at which to dispose an experience icon, and to display each experience icon on the further experience space at the respective selected further location in response to selection of a further location on the experience space for each experience icon, the selected further location representative of a desired further location in at least 2 dimensional space relative to the observer of the observer experience associated with the experience icon at the further defined time.

In accordance with a fourth aspect of the present invention, there is provided a media content planning system comprising:
a data storage device arranged to store information indicative of scenes of a media content project;
the system arranged to communicate information to a user interface device for display at the user interface device, the information indicative of:
scene indicia indicative of locations of scenes of a media content project and/or respective timings of occurrence of the scenes of the media content project;
an experience space associated with a scene and including a representation of an observer, the experience space associated with a defined time; and
at least one experience icon in the experience space, each experience icon indicative of the location in at least 2 dimensional space relative to an observer of an observer experience, the location of each experience icon in the experience space being representative of a desired location in 2 dimensional space relative to the observer of the observer experience in the scene;
the system arranged to receive information indicative of selection by a user of an experience space associated with a defined time, to receive information indicative of selection by the user of an observer experience to be associated with the scene, and to receive information indicative of a selection by the user of a location on the experience space at which to dispose an experience icon associated with the observer experience in at least 2 dimensional space relative to the observer, wherein in response to selection of a location on the experience space for each experience icon, the system is arranged to communicate to the user interface device information usable by the user interface device to display each experience icon on the experience space at the respective selected location;

the system arranged to receive information indicative of selection by a user of at least one further experience space associated with a further defined time corresponding to a later time in the scene than the defined time, and to receive information indicative of selection by the user of a further location on the experience space at which to dispose the experience icon associated with the observer experience in at least 2 dimensional space relative to the observer, wherein in response to selection of a further location on the experience space for the experience icon, the system is arranged to communicate to the user interface device information usable by the user interface device to display the experience icon on the further experience space at the respective selected further location; and the system arranged to store data indicative of:
the selected observer experience;
the scene associated with each observer experience, and
for each experience space, the selected location in at least 2 dimensional space relative to the observer of each observer experience relative to the observer.

In accordance with a fifth aspect of the present invention, there is provided a project planning system comprising:
a data storage device arranged to store information indicative of a project;
a user interface arranged to:
enable a user to select an experience space for display, the experience space associated with a defined time;
enable the user to select at least one experience icon indicative of an experience in the project;
enable the user to select a location on the experience space at which to dispose each experience icon, and to display each experience icon on the experience space at the respective selected location in response to selection of a location on the experience space for each experience icon, each selected location representative of a desired location in at least 2 dimensional space of an experience at the defined time;
enable the user to select at least one further experience space for display, each further experience space associated with a further defined time corresponding to a later time than the defined time;
each further experience space enabling the user to select a further location on the experience space at which to dispose an experience icon, and to display the experience icon on the further experience space at the selected further location in response to selection of a further location on the further experience space, the selected further location representative of a desired further location in at least 2 dimensional space of the experience associated with the experience icon at the further defined time; and
the system arranged to store data indicative of:
the or each selected experience;
the scene associated with each experience, and
for each experience space, the selected location in at least 2 dimensional space of each experience.

BRIEF DESCRIPTION OF THE DRAWINGS

The present invention will now be described, by way of example only, with reference to the accompanying drawings, in which.

DESCRIPTION OF AN EMBODIMENT THE INVENTION

In this specification, it will be understood that a "closed world" is a defined space environment wherein an observer is not able to roam freely and scenes of the world are presented to the observer in a defined structure, such as for example in 360° video; and an open world is an environment wherein an observer is able to roam, either in accordance with a defined journey or freely in any direction.

Figure 1:
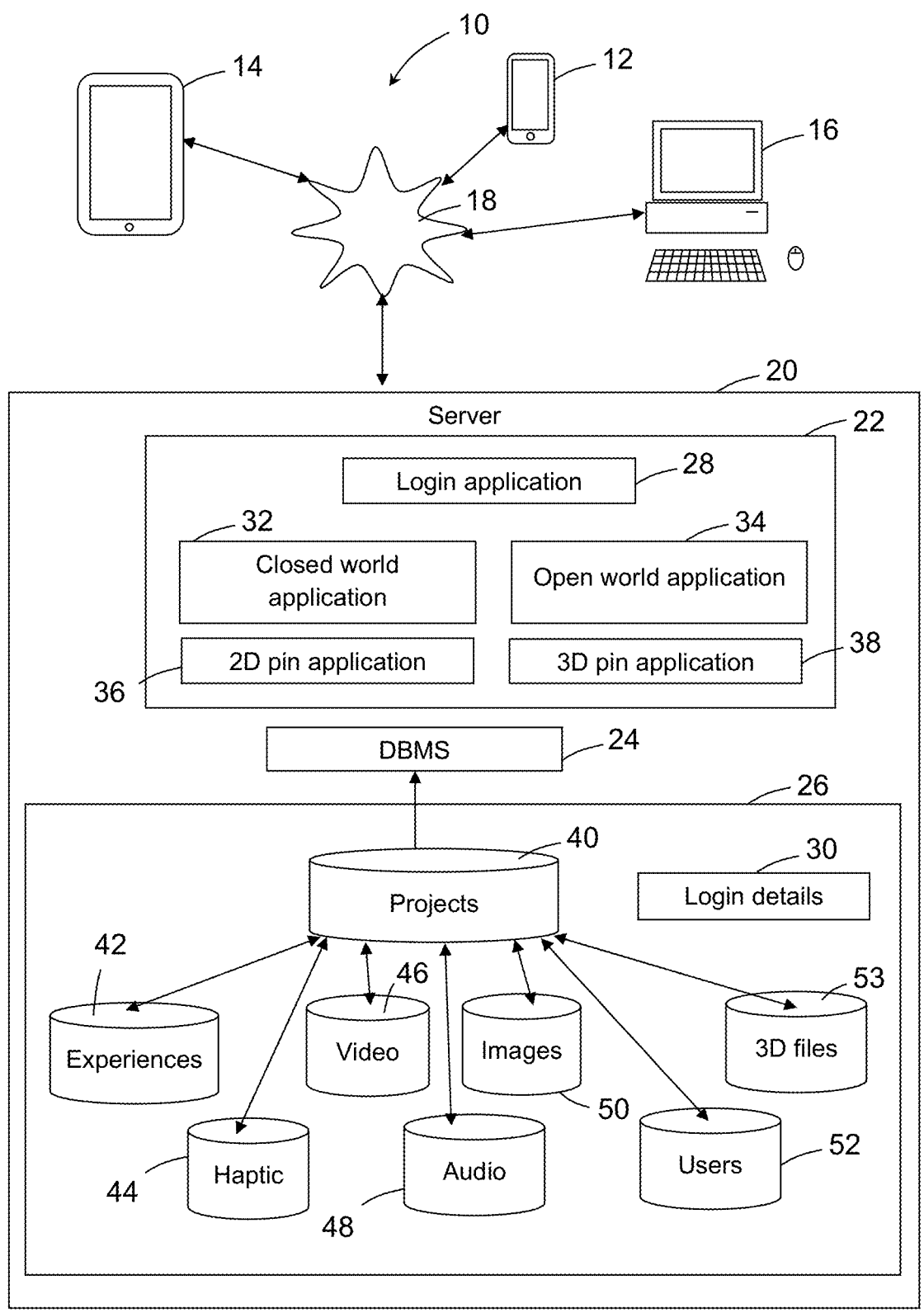
FIG. 1 is a schematic block diagram of a media content planning system in accordance with an embodiment of the present invention.
Figure 2:
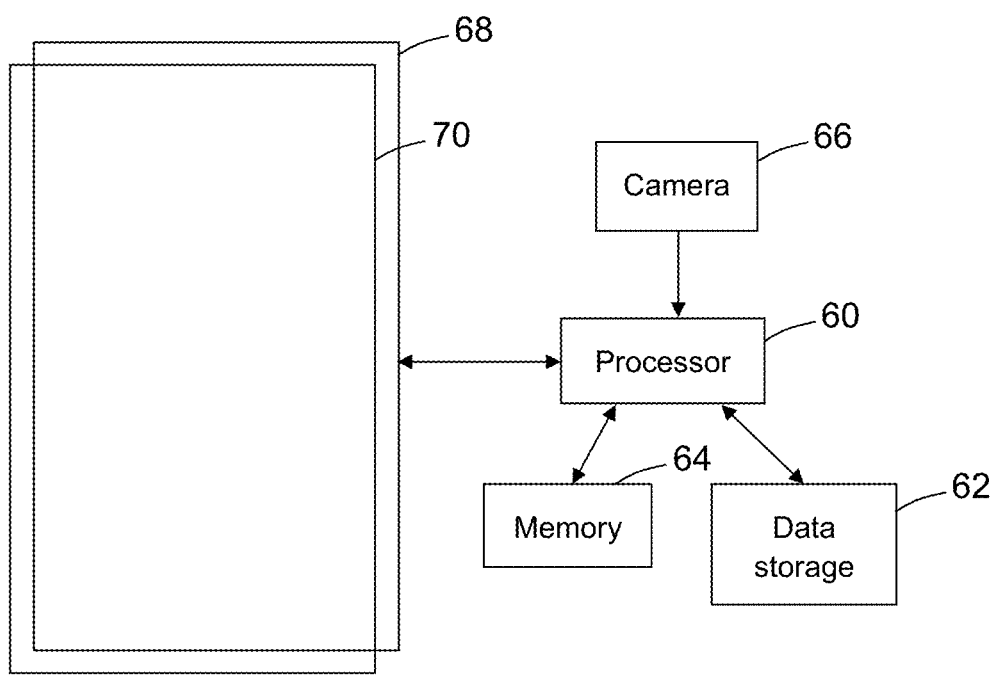
FIG. 2 is a schematic block diagram of functional components of a user computing device for use with the system shown in FIG. 1.

Referring to FIGS. 1 and 2 of the drawings, there is shown a media content planning system 10 arranged to facilitate creation of a pre-production blueprint of media content, in particular virtual reality (VR), augmented reality (AR) and mixed reality (MR) content, that can be used by media creators to conceptualise and plan an immersive media experience prior to creation of the actual media content. The system may be applied to a non-linear mixed reality experience.

The system is arranged to facilitate mapping of 3D ideas in order to represent the ideas as they would appear to a VR/AR/MR participant within space and time by creating a blueprint for VR/AR/MR content. The system allows a user to spend time developing a representation of the structure and desired content of a VR/AR/MR world, and to share the intended experience of the created VR/AR/MR world with others for collaboration purposes.

In a closed world implementation, the system facilitates creation of an ordered scene sequence, and enables a user to plot the relative locations of observer experiences in each scene and to determine the particular observer experiences that occur at the respective locations, such as audio, visual and/or haptic experiences. For example, in each scene the system enables a user to plot the relative locations of audio, visual and/or haptic experiences for an observer in 2D or 3D space.

In an open world implementation, the system facilitates creation of a 3D world space, enables a user to plot the relative locations of scenes in the world space, enables a user to plot the relative locations of observer experiences at each of the scene locations in 2D or 3D space, and enables a user to determine the particular observer experiences that occur at the respective scene locations, such as audio, visual and/or haptic experiences.

In this way, the system maps content ideas as they would appear to a VR/AR/MR observer within the space and time of the experience. Each observer may represent a character and therefore the system may be used to define different experiences and/or different point of view for each character.

In this example, the system 10 is implemented using a remote computing device in the form of a server 20 accessible by user computing devices that include a smartphone 12, a tablet computer 14 and a personal computing device 16 arranged to communicate through a communications network 18.

In this example, the user computing devices 12, 14, 16 serve to provide a user interface arranged to present screens associated with the system 10 to a user and facilitate reception of inputs from the user, with functional components 22 of the system substantially implemented at the server 20. However, it will be understood that other implementations are possible. For example, a user computing device 12, 14, 16 may be arranged to substantially implement functional components 22 of the system as a stand-alone device, for example by downloading or otherwise installing an application on the user device 12, 14, 16, or functional components 22 of the system 10 may be implemented partly by a user computing device 12, 14, 16 and partly by the server 20.

In this example, the communications network 18 includes the Internet, although it will be understood that any suitable communications network that includes wired and/or wireless communication paths is envisaged. It will also be understood that any suitable computing device capable of executing programs, displaying information to a user and receiving inputs from the user is envisaged.

In order to implement desired functionality at the server 20, in this example the server 20 is arranged to include at least one dedicated software application, although it will be understood that functionality may be implemented using dedicated hardware or a combination of dedicated hardware and software.

The functional components 22 implemented by the server 20 include a database management system (DBMS) 24 arranged to manage data stored in a data storage device 26 that may include a local data storage device, for example implemented using SQL protocols, and/or cloud based data storage; a login application 28 arranged to manage a user login process, for example by receiving user login details from a user computing device 12, 14, 16 and verifying the received login details with reference login details 30 stored in the data storage device 26; a closed world application 32 arranged to implement functionality for a closed world project; an open world application 32 arranged to implement functionality for an open world project; a 2D pin application 36 that enables a user to select the relative locations of observer experiences for an observer in a scene in 2D space; and a 3D pin application 38 that enables a user to select the relative locations of observer experiences for an observer in a scene in 3D space.

In this example, the data storage device 26 is arranged to store data used by the system 10 in multiple relational databases that may be configured according to SQL protocols. The databases include:
  a projects database 40 arranged to store data indicative of VR/AR/MR projects including the project name, project type (closed world, open world journey, or open world free roaming) and scene locations;
  an experiences database 42 arranged to store data indicative of the relative locations of observer experiences at each of the scene locations, and the types of observer experiences that occur at the respective scene locations, such as audio, visual and/or haptic experiences;
  a haptic database 44 arranged to store data indicative of haptic information, such as touch or smell, associated with observer haptic experiences linked to the scene locations;
  a video database 46 arranged to store data indicative of video information associated with observer video experiences linked to the scene locations;
  an audio database 48 arranged to store data indicative of audio information associated with observer audio experiences linked to the scene locations, for example traditional audio and/or ambisonic/spatial audio;
  an images database 50 arranged to store data indicative of image information associated with observer image experiences linked to the scene locations;
  a users database 52 arranged to store data indicative of registered users associated with the system; and
  a 3D files database 53 arranged to store 3D files, for example in .OBJ format.

An example configuration of a user computing device 12, 14, 16, in this example a tablet computer 14, is shown in FIG. 2.

The user computing device 14 includes a processor 60 arranged to control and coordinate operations in the user computing device 14, a data storage device 62 arranged to store programs and data used by the processor 60 to implement the desired functionality, and a memory 64 used by the processor to temporarily store programs and/or data during use.

The user computing device 14 also includes a display 68 and a user interface 70, in this example in the form of a touch screen, arranged to enable the user computing device 14 to receive inputs from a user.

An example implementation with reference to screens displayed to a user on the user computing device 12, 14, 16 is shown in FIGS. 3 to 13. In this example, the computing device 12, 14, 16 is a tablet computer 14 having a user interface in the form of a touch screen 70 overlaid on the display 68. As such, inputs to the computing device 14 are primarily effected by touching the touch screen 70 using taps, swipes and any other device recognizable gestures. However, it will be understood that the example is equally applicable to implementations on other computing devices. For example, the user computing device may include a head mounted device (HMD) and a tool that supports WebVR.

A user first logs into the system 10 by entering user login details at the user interface implemented by the user computing device 14, and the system 10 verifies the entered login details by communicating the login details to the login application 28 and comparing the entered login details at the login application 28 with stored reference login details 30 associated with the user.

It will be understood that the user interface may be implemented on the user computing device 12, 14, 16 by installing an interface application on the user computing device 12, 14, 16 arranged to communicate with the server 20, the user interface may be implemented through a web browser, for example by serving web pages corresponding to the screens shown in FIGS. 3 to 13 to the user interface device as required, or the user interface may be implemented in any other way.

Figure 3:
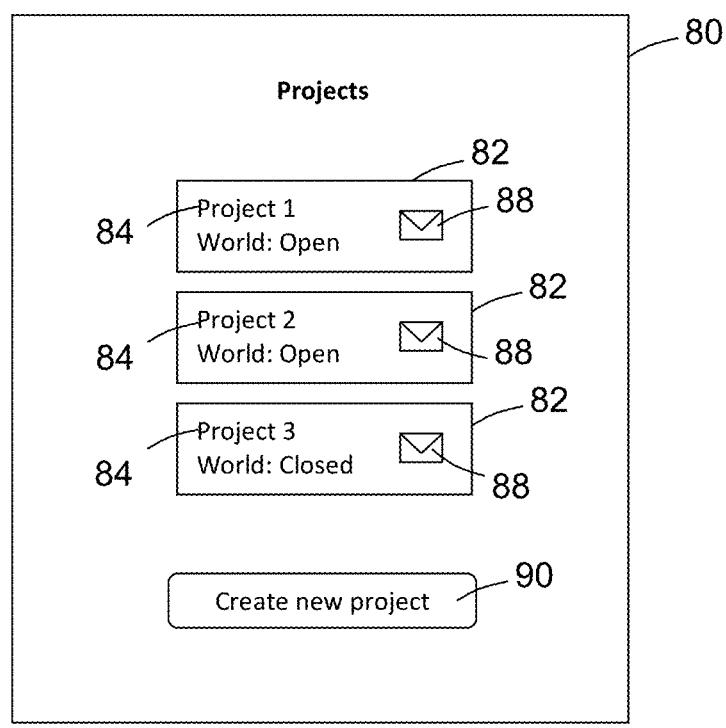
FIGS. 3 to 13 are diagrammatic representations of screens presented to a user on a user computing device by the system shown in FIG. 1.

As shown in FIG. 3, after a user has successfully logged in, the user is presented with a home page 80 that displays information indicative of created projects 82 to the user. Each displayed project 82 includes a project name 84, world type indicia 86 indicative of the type of world environment associated with the project (closed world or open world), and a share icon 88 usable to provide a selected user with a link to the project so that the selected user is able to collaborate in the project creation process.

The home page 80 also includes a create new project button 90 usable to create new project.

Figure 4:
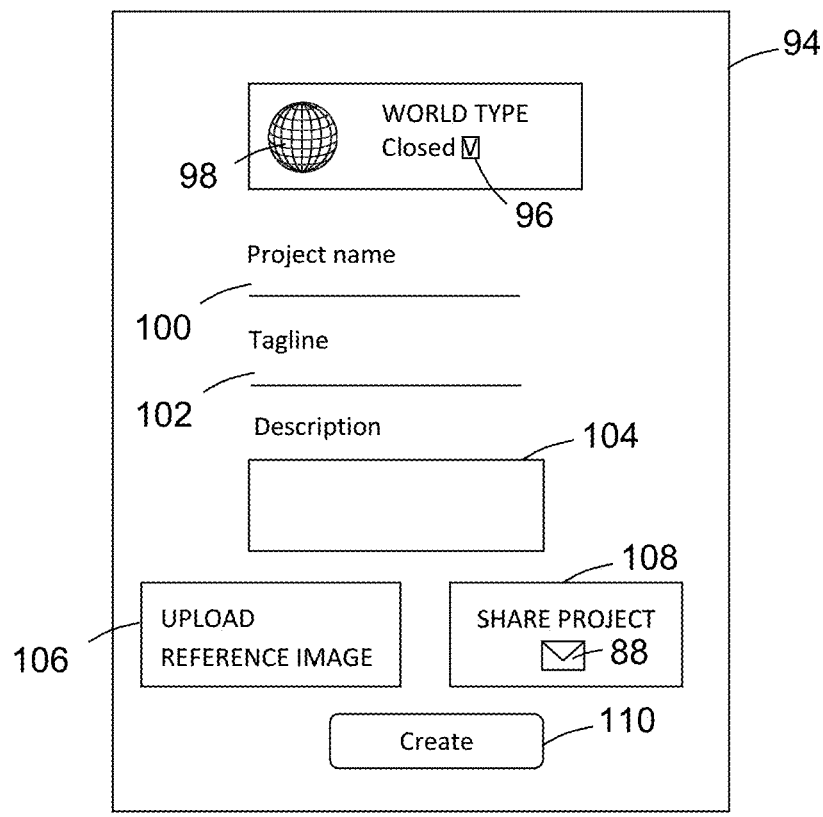

Activation of the create new project button 90 causes a create new project screen 94 to be displayed, as shown in FIG. 4. Like and similar features are indicated with like reference numerals.

The create new project screen 94 includes a world type selection field 96 that enables a user to select the type of world environment associated with the project, that is, a closed world environment, a journey open world environment or a free roaming open world environment; a world type icon 98 representative of the type of world selected; a project name field 100 for receiving a project title; a project tagline field 102 for receiving a project tagline; and a description field 104 for receiving descriptive information associated with the project.

The create new project screen 94 also includes a reference image field 106 usable to facilitate selection and display of an image that is representative of the project, and a create button 110 that when activated causes a new project record to be created in the projects database 40. Activation of the create button 110 also causes a relevant project overview screen 120, 230, 260 associated with the project to be displayed as shown in FIG. 6, 12 or 13.

Figure 5:
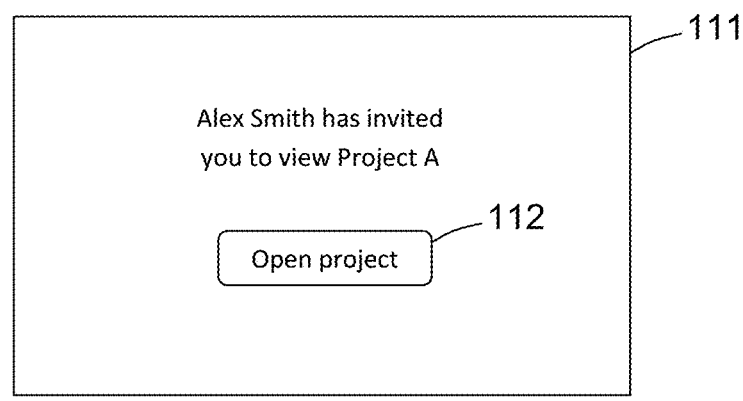

Selection of the share icon 88 on the home page 80 or on the create new project screen 94 causes a project share screen 111 to be displayed on a user interface of the user selected to collaborate on the project, as shown in FIG. 5.

Figure 6:
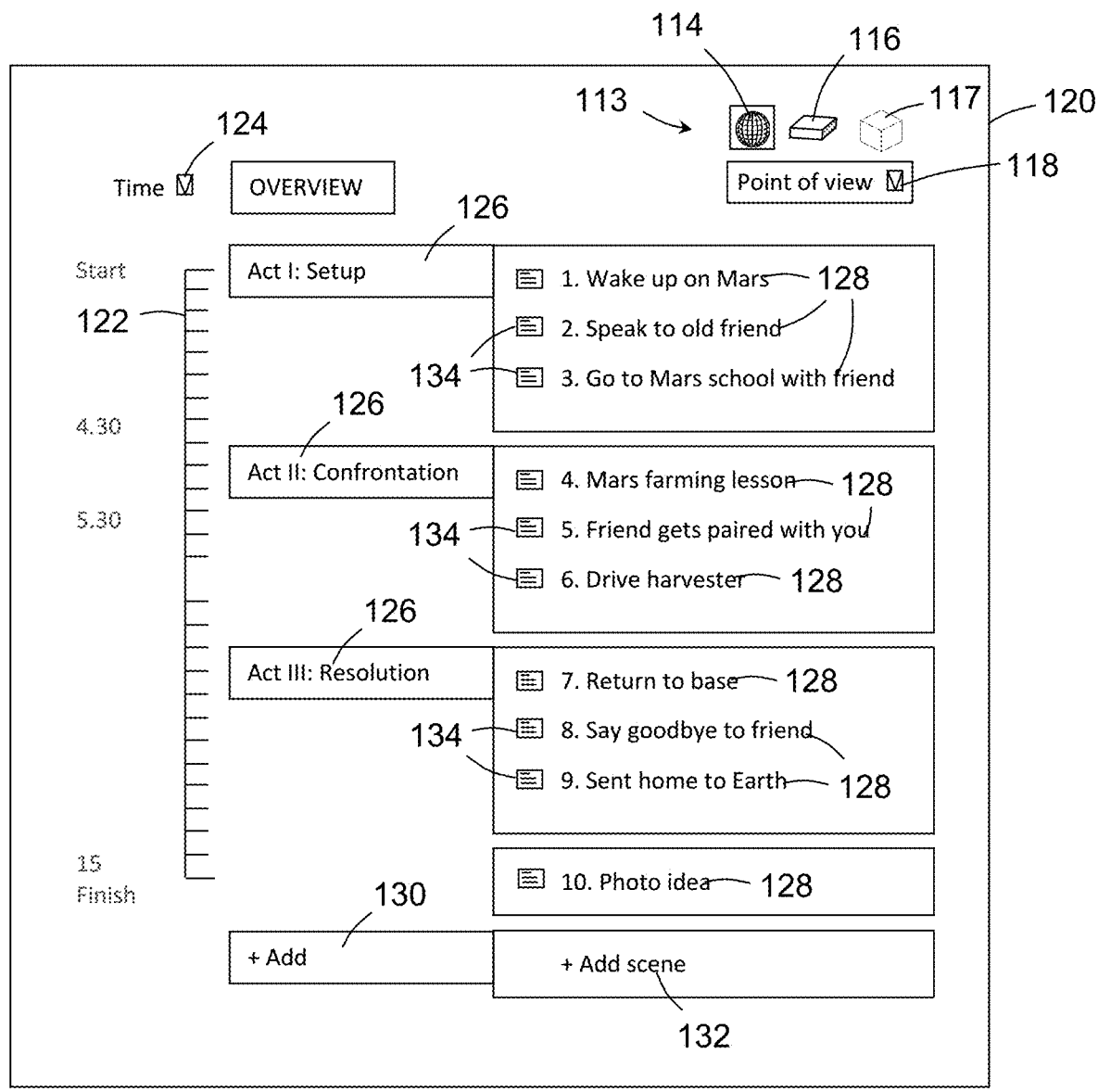
Figure 12:
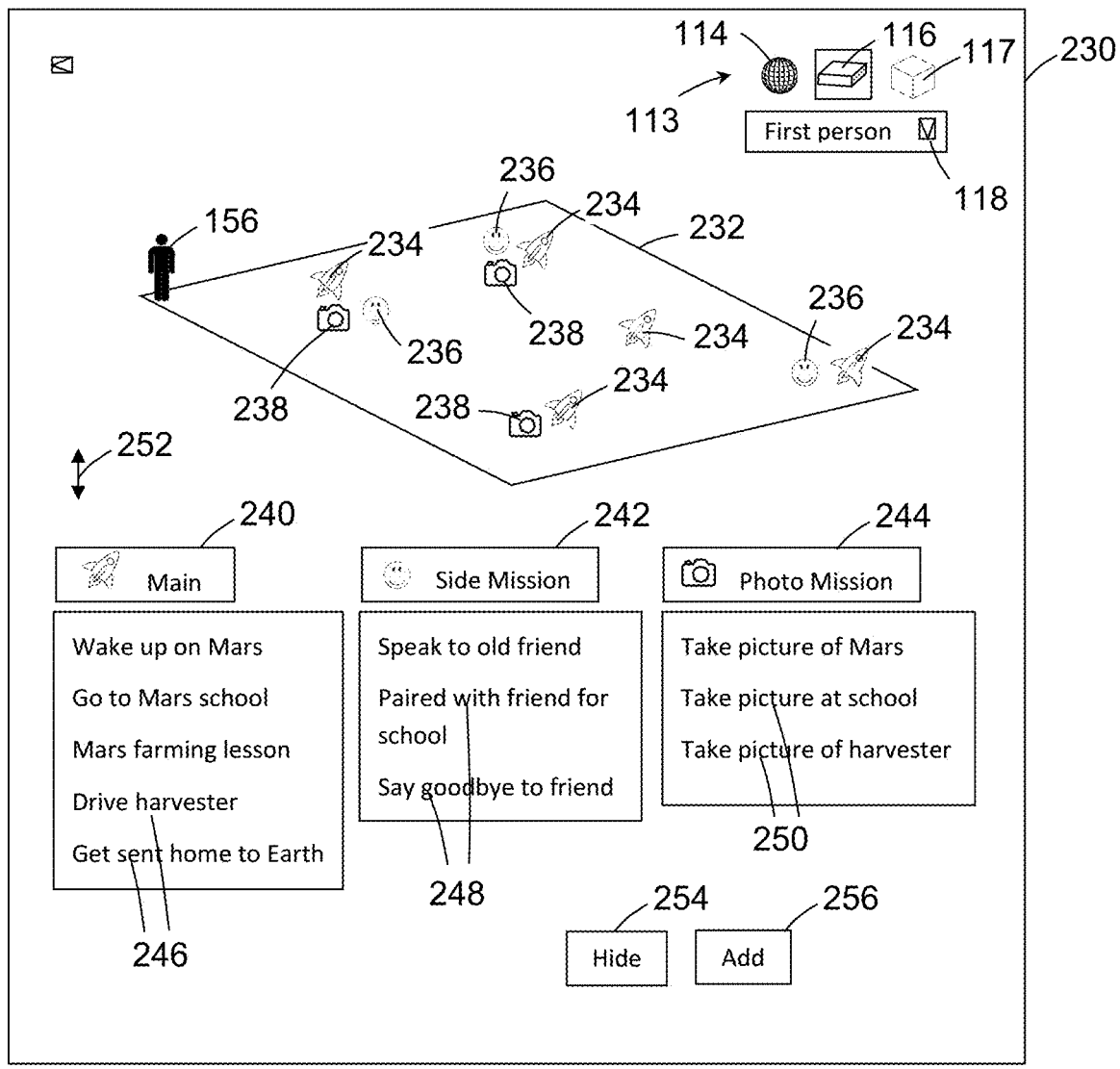
Figure 13:
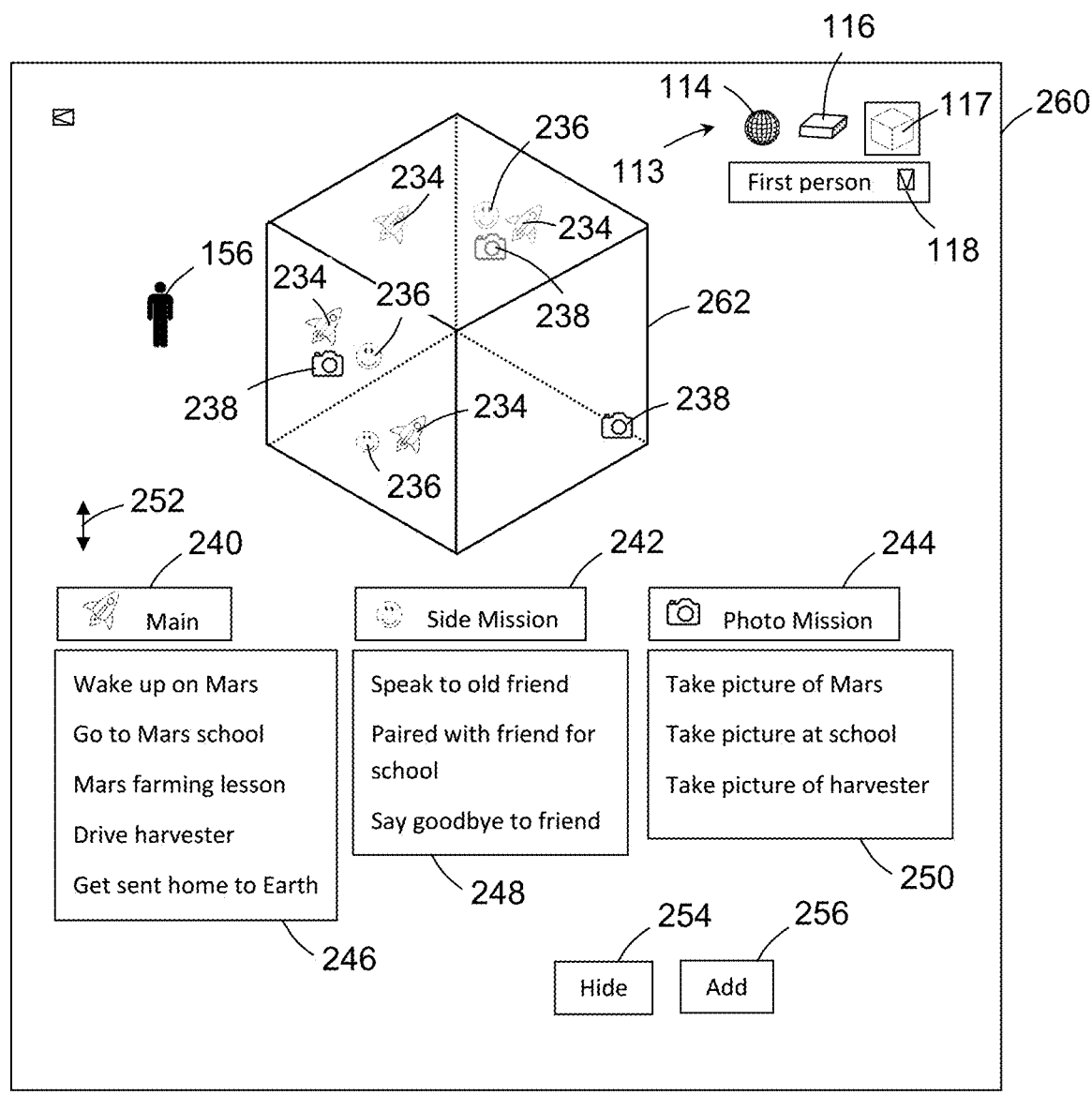

The shared project screen 111 includes an open project button 112 that when activated causes the relevant project overview screen 120, 230, 260 associated with the project to be displayed as shown in FIG. 6, 12 or 13.

In this example, a user has selected a closed world environment and as such a closed project overview screen 120 associated with the project is displayed, as shown in FIG. 6.

The closed project overview screen 120 includes world type selectors 113—a closed world selector 114, a journey open world selector 116 and a free roaming open world selector 117 that enable a user to switch between world types, and a point of view selector 118 arranged to facilitate selection of the observer point of view, in this example a first person point of view.

Since the present project is a closed world project, the closed project overview screen 120 shows a time line 122 defining timing for a sequence of defined scenes 128 to be presented to an observer during the closed world experience. The time line may be displayed or hidden using a hide/show button 124.

The scenes 128 are organized in scene groups 126, each scene group 126 representing a different part of the story associated with the project, in this example "Setup", "Confrontation" and "Resolution". New scene groups 126 are added using an add scene group button 130. Similarly, new scenes 128 are added using an add scene button 132.

Figure 7:
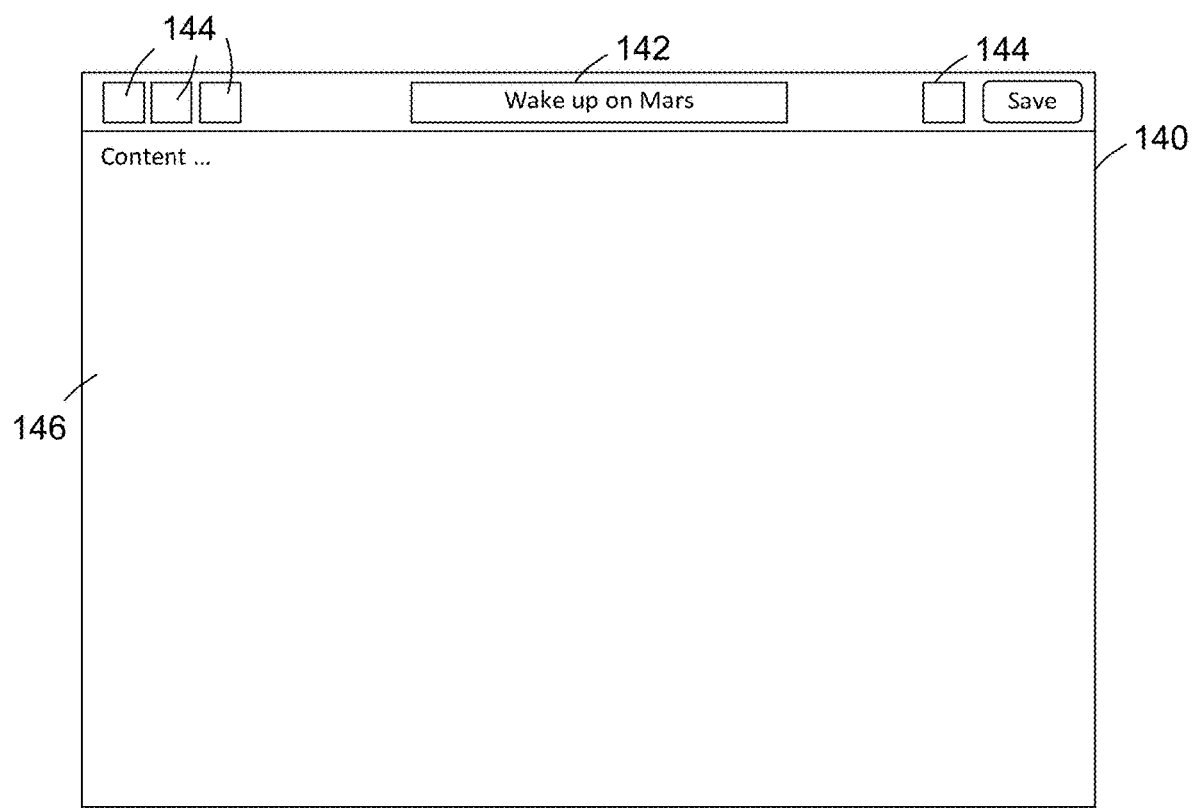

Each scene 128 has an associated notes icon 134 that when selected causes a notes screen 140 as shown in FIG. 7 to be displayed.

The notes screen 140 includes a scene title 142 and is usable to add notes for a scene into a content field 146, for example using edit tools 144.

Figure 8:
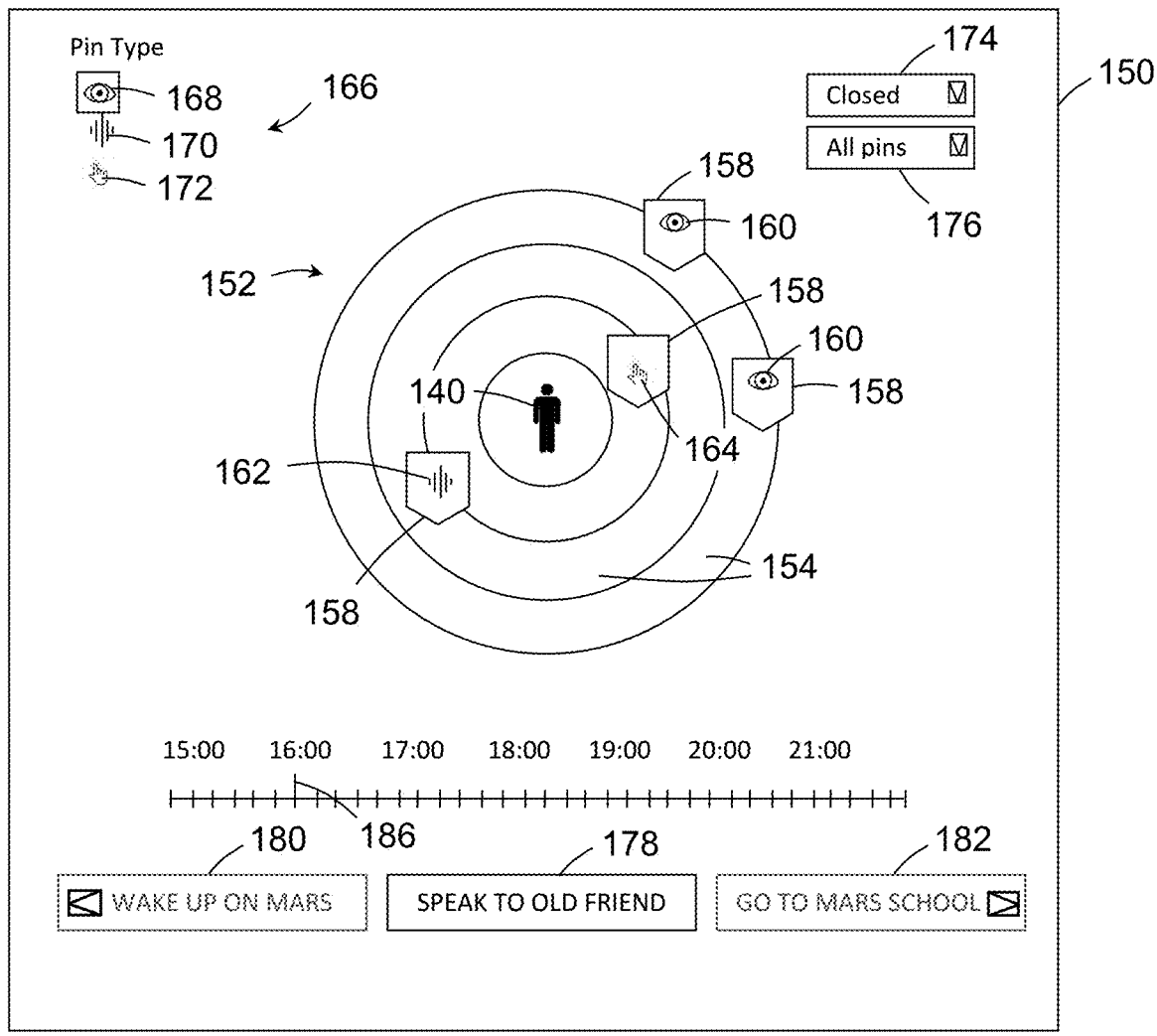

Selection of a scene 128 causes a 2D experience location screen 150 (hereinafter a "plate screen") to be displayed, as shown in FIG. 8. The plate screen 150 is usable to select the locations of experiences relative to an observer that can occur at the scene 128, and the types of observer experiences that occur, such as audio, video and/or haptic experiences.

The plate screen 150 includes an experience space, in this example a plate area 152, that has several concentric annular portions 154 surrounding an observer icon 156. Disposable on the plate area 152 are pins 158 that represent observer experiences relative to the observer 156. Using the plate screen 150, a user is able to select the desired location of an experience relative to the observer 156 and the type of observer experience. In this example, available observer experiences include video, image, audio and haptic experiences.

Each pin 158 includes a pin type icon, for example a visual pin icon 160, an audio pin icon 162 or a haptic pin icon 164. The type of pin is selected using pin type selectors 166, in this example a visual pin selector 168, an audio pin selector 170 and a haptic pin selector 172.

Figure 9:
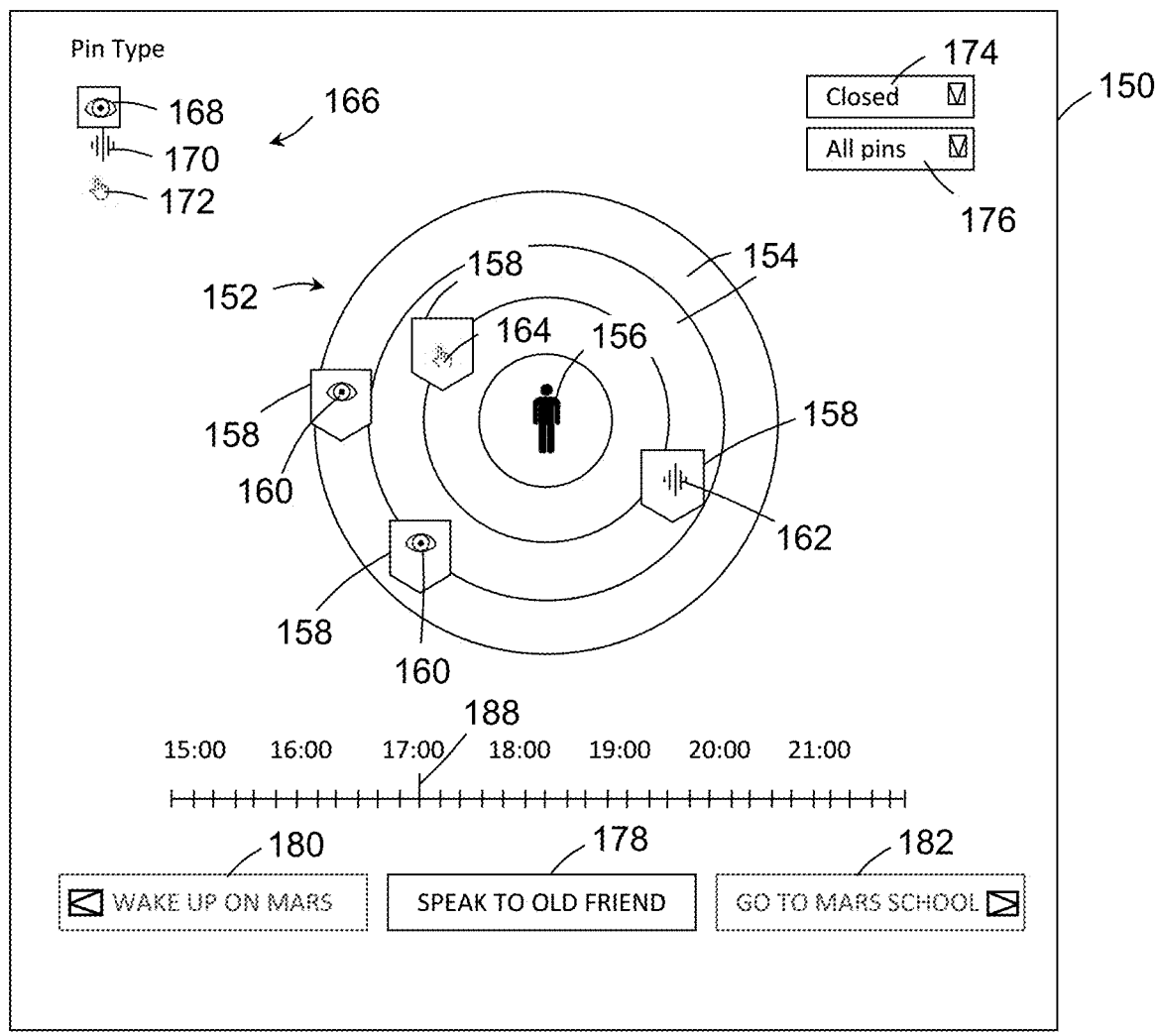
Figure 10:
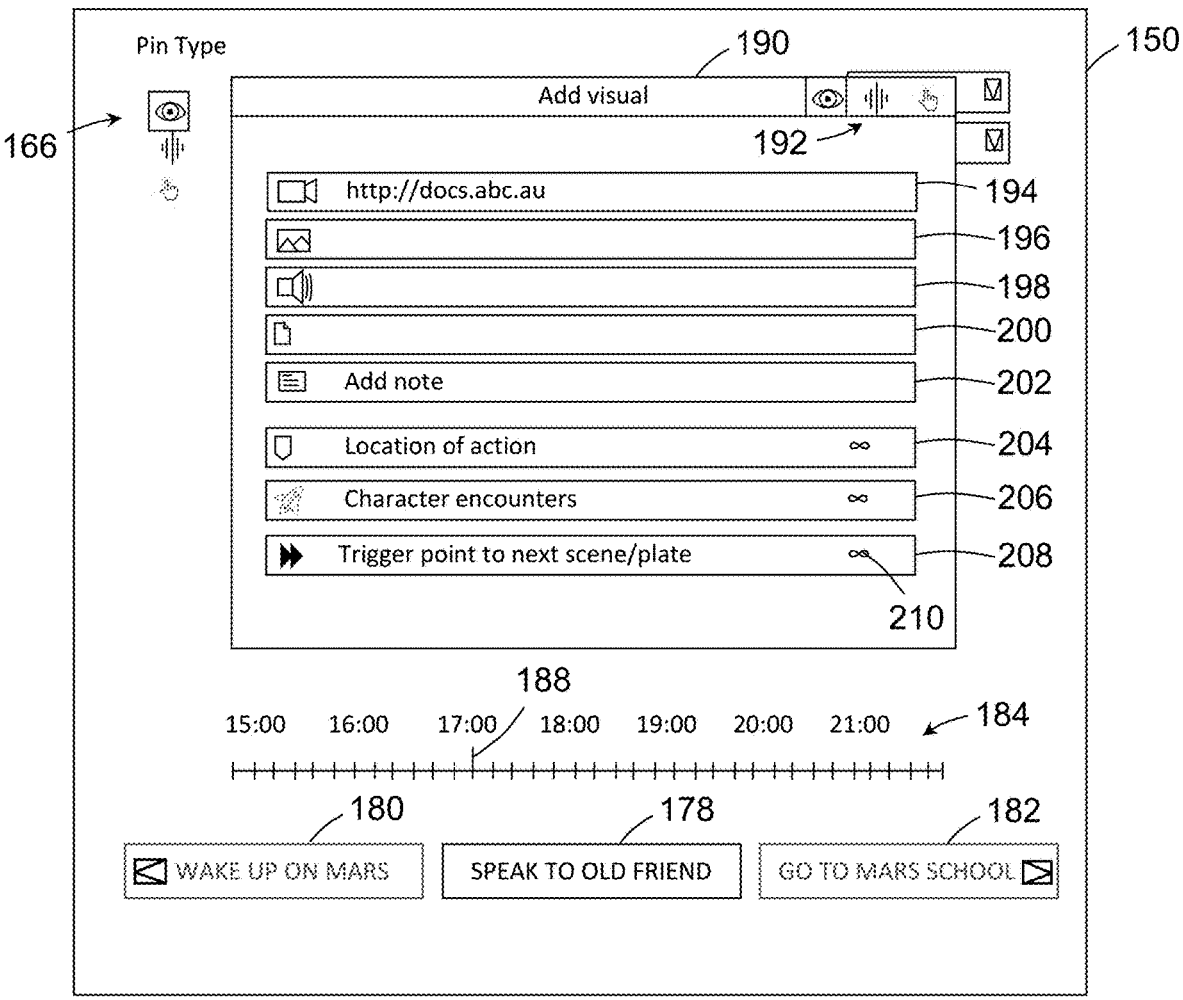
Figure 11:
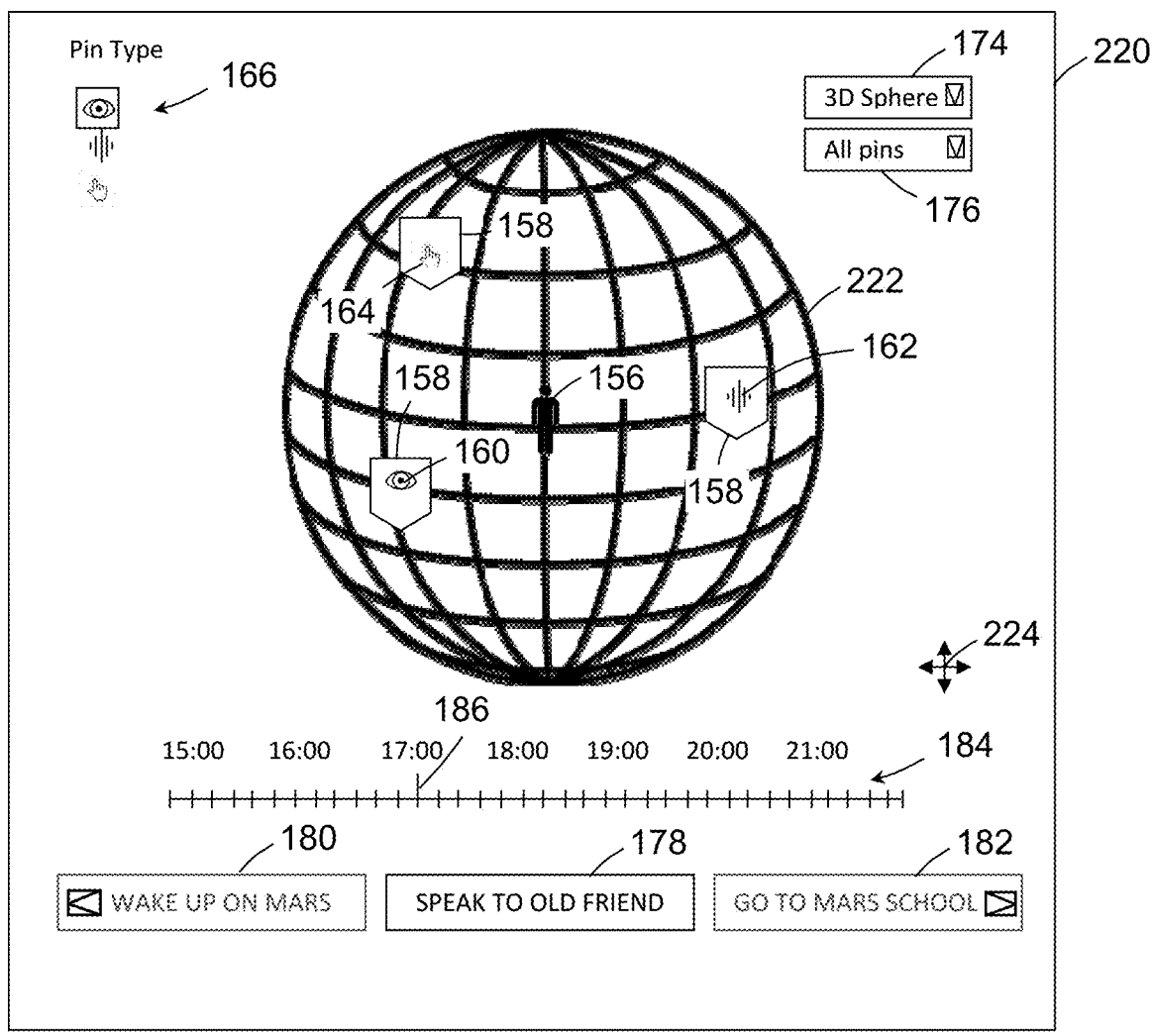

The plate screen 150 also includes an experience model selector 174 that can be used to select the type of experience selection model, in this example a 2D experience selection model, as shown in FIGS. 8 and 9, wherein a user is able to select in 2D the locations of experiences relative to an observer that can occur at a scene, and a 3D experience selection model, as shown in FIG. 11, wherein a user is able to select in 3D the locations of experiences relative to an observer that can occur at a scene.

The plate screen 150 also includes a pin view selector 176 usable to select the type of pins 158 that are displayed on the plate area 152, for example all pins 158, only haptic pins, only audio pins or only video pins.

The plate screen 150 also includes a scene identifier 178 that identifies the title of the scene associated with the displayed plate area 152, in this example a scene titled "speak to an old friend"; a previous scene navigation button 180 usable to navigate to a previous scene in the story timeline; and a next scene navigation button 182 usable to navigate to a subsequent scene in the story timeline.

The plate screen 150 also includes a timeline 184 that includes a current time marker 186 to indicate the relevant time in the scene that corresponds to the experiences and relative locations of the experiences represented by the pins 158 on plate area 152.

Within a scene, it is possible to create multiple plate screens 150, each plate screen 150 corresponding to a different time in the scene and each plate screen 150 potentially including different pins 158 and/or different pin locations relative to the observer 156. For example, as shown in FIG. 8, a further plate screen 150 associated with the scene "speak to old friend" is shown, with the further plate screen 150 representing a later time 188 in the scene than the plate screen 150 shown in FIG. 8. In this way, during a scene an observer is able to have different experiences that are linked to different locations relative to the observer.

Selection of a pin selector 166 by a user and subsequent selection of a location on the plate area 152 causes a pin 158 of the type that has been selected to be added to the plate area 152. Subsequent selection of the pin causes an add pin window 190 to be displayed over the plate screen 150. The add pin window 190 is used to add information indicative of the relevant experience or to add a link to information indicative of the relevant experience.

In this example, the add pin screen 190 includes a video link box 194 usable to add information indicative of the location of a selected video to be associated with the pin 158, an image link box 196 usable to add information indicative of the location of a selected image to be associated with the pin 158, an audio link box 198 usable to add information indicative of the location of selected audio to be associated with the pin 158, and a document link box 200 usable to add information indicative of the location of a selected document to be associated with the pin 158.

The add pin screen 190 also includes an add note field 202 usable to add a note to the pin 158, an action location field 204, a character encounters field 206 and a next scene trigger point field 208. A scene link indicator 210 may also be included to link the scene to other scenes.

The action location field 204, character encounters field 206 and next scene trigger point field 208 enable a user to track, log and group encounters and interactions that are non-linear within an experience. For example, a user can create an opportunity for users to link to other worlds and scenes that are non-chronological, or the user may define different points of view and/or different experiences for different characters associated with the media content.

As an alternative to a 2D experience selection model, as shown in FIGS. 8 and 9, a 3D experience selection model may be used, as shown in FIG. 11, wherein a user is able to select in 3D the locations of experiences relative to an observer that can occur at a scene. Like and similar features are indicated with like reference numerals.

The 3D experience selection model may be selected by selecting "3D sphere" instead of "closed" using the experience model selector 174 and this causes a 3D experience location screen 220 (hereinafter a "spherical space screen") to be displayed. The spherical space screen 220 is usable to select the locations of experiences in 3D relative to an observer that can occur at a scene, and the types of observer experiences that occur, such as audio, video and/or haptic experiences.

Instead of a plate area 152 to represent the locations of experiences in 2D relative to an observer, a spherical experience space 222 is provided to represent the locations of experiences in 3D relative to an observer.

In a similar way to the plate screen 150, using the spherical space screen 220 a user is able to select the desired location of an experience relative to the observer 156 and the type of observer experience. In this example, available observer experiences include video, image, audio and haptic experiences. In order to facilitate addition of pins 158 at desired 3D locations, the spherical space screen 220 includes a navigation tool 224.

Referring to FIGS. 4 and 6, instead of a closed world, if a journey open world is selected using the world type selection field 96 on the create new project screen 94, or if a journey open world selector 116 is selected on the closed project overview screen 120, a journey open world overview screen 230 as shown in FIG. 12 is displayed. Like and similar features are indicated with like reference numerals.

The journey open world overview screen 230 is used to define the relative locations of scenes in a world space that is structured as a journey in the sense that an underlying direction for the observer is defined but the observer is able to roam within the journey, to define the relative locations of observer experiences at each of the scene locations, and to define the particular observer experiences that occur at the respective scene locations, such as audio, visual and/or haptic experiences.

It will be understood that unlike the closed world project described in relation to FIGS. 6 to 11 wherein the scenes are presented to an observer according to a defined structure and timing, with the journey open world represented in FIG. 12, an observer has at least some control over movement of the observer and therefore the location of the observer relative to the available scenes, and over the consequent experiences provided to the observer at the scenes.

As shown in FIG. 12, the journey open world overview screen 230 includes a journey space 232 that represents the available roaming space of an observer 156. A user is able to add scenes by adding scene icons to the journey space 232 at locations relative to the observer 156 that correspond to the desired locations of scenes, for example by selecting the locations on a touch screen.

The scenes may be grouped into several scene groups 240, 242, 244 with each scene group allocated a different scene icon. In this example, the scene icons include a main scene icon 234, a side mission icon 236 and a photo mission icon 238.

The scene titles 246, 248, 250 of the available scenes may be shown on the journey open world overview screen 230 in a plurality of scene groups 242, 242, 244, and the scene groups may be hidden or displayed using a hide/show button 254.

The journey open world overview screen 230 also includes an add scene button 256 that may be used to add a scene to a scene group 240, 242, 244.

In this example, selection of a scene icon 234, 236, 238 on the journey space 232 causes the relevant scene title 246, 248, 250 to be highlighted in the relevant scene group 240, 242, 244. Selection of a scene title 246, 248, 250 causes the plate screen 150 shown in FIGS. 8 and 9 to be displayed to enable the user to define the desired locations of experiences relative to the observer 156 for the scene and the type of observer experiences. At the plate screen 150, the user may select "3D sphere" instead of "closed" using the experience model selector 174 if it is desired to define the locations of experiences in 3D relative to an observer instead of 2D.

Referring to FIGS. 4 and 6, if a free roaming open world is selected using the world type selection field 96 on the create new project screen 94, or if a free roaming world selector 117 is selected on the closed project overview screen 120, a free roaming open world overview screen 260 as shown in FIG. 13 is displayed. Like and similar features are indicated with like reference numerals.

The free roaming open world overview screen 260 is similar to the journey open world overview screen 230 except that the free roaming open world overview screen 260 is used to define the relative locations of scenes in a world space that is structured as a free roaming space instead of a structured journey. As with the journey open world overview screen 230, the free roaming open world overview screen 260 is used to define the locations of scenes relative to an observer and, through the plate screen 150 or the sphere screen 220 shown in FIGS. 8, 9 and 11, the relative locations of observer experiences at each of the scene locations, and the particular observer experiences that occur at the respective scene locations, such as audio, visual and/or haptic experiences.

It will be understood that with a free world roaming project, the scenes are not presented to an observer according to a defined structure, and instead an observer has full control over movement of the observer and therefore the location of the observer relative to the available scenes and the consequent experiences provided to the observer at the scenes.

As shown in FIG. 13, the free roaming open world overview screen 260 includes a free roaming space 262 that represents the available roaming space of an observer 156, in this example the free roaming space 262 shown as a cube. A user is able to add scenes by adding scene icons to the free roaming space 262 at locations that correspond to the desired locations of scenes, for example by selecting the location on a touch screen.

In a variation, instead of using a defined shape to represent the free roaming space, the free roaming space may be defined according to a computer-generated space mesh that can have any shape. For example, the space mesh may represent an actual real world space, and the space mesh may be generated using a LIDAR or matterport scanner.

Examples of the media content planning system will now be described during use.

In a first example, a user desires to create a 360° video with defined video, audio and/or haptic responses in defined scenes and at defined times of the video.

Using the system 10, if necessary, the user first adds haptic, video, audio and image experience information to the haptic, video, audio and/or images databases 44, 46, 48, 50, then creates a closed world project by selecting the create new project button 90 on the home page 80, and selecting "closed" in the world type selection field 96 on the create new project screen 94 shown in FIG. 4. The user can also add a project name, tagline, description and reference image using project name, tagline, description and reference image fields 100, 102, 104, 106 on the create new project screen 94.

After selecting the create button 110, the closed world project overview screen 120 is displayed as shown in FIG. 6.

Using the closed world project overview screen 120, the user is able to define scene groups 126, scene titles 128, the point of view of the observer using the point of view selector 118, and the order and timing of the scene groups 126 and scenes 128. The user is also able to add notes to the scenes 128 using a notes icon 134 and notes screen 140.

The user is also able to define the observer experiences that occur at a scene 128 and the locations of the experiences relative to the observer using the plate screen 150 as shown in FIGS. 8 and 9. If the user wishes to define observer experiences in 3D space, the user selects 3D sphere in the experience model selector 174 which causes the sphere screen 22 to be displayed as shown in FIG. 11.

Using either the plate screen 150 or the sphere screen 220, the user adds pins 158 to the relevant plate area 152 or spherical space 222 at locations relative to the observer 156 that correspond to the desired locations of the observer experiences at a defined time indicated by a time marker 186, and the user selects the type of user experiences corresponding to each pin 158 using the add pin window 190. For example, an experience may be an explosion that occurs behind the observer 156 in a defined scene at a defined time in the scene. For this experience, the user would add a pin to the plate area 152 or sphere space 222 at a location that corresponds to a location behind the observer 156, and the user would identify relevant video and optionally haptic response associated with the explosion to the pin 158 using the add pin window 190.

Subsequent observer experiences in the scene occurring later can be added by selecting a different time on the time line 184 and adding pins 158 to a further plate area 152 or spherical space 222 at locations relative to the observer 156 that correspond to the desired locations of the desired observer experiences at the different time.

In a second example, a user desires to create a free roaming game world with defined video, audio and/or haptic responses occurring in defined scenes at defined scene locations in the game world and at defined locations in the scenes relative to the observer 156.

Using the system 10, if necessary, the user first adds haptic, video, audio and image experience information to the haptic, video, audio and/or images databases 44, 46, 48, 50, then creates a free world roaming project by selecting the create new project button 90 on the home page 80, and selecting free roaming open world in the world type selection field 96 on the create new project screen 94 shown in FIG. 4. The user can also add a project name, tagline, description and reference image using project name, tagline, description and reference image fields 100, 102, 104, 106 on the create new project screen 94.

After selecting the create button 110, the free roaming open world overview screen 260 is displayed as shown in FIG. 13.

Using the free roaming open world overview screen 260, the user is able to define:
scene types and group the scene types into scene groups 240, 242, 244;
scene titles 246, 248, 250;
the point of view of the observer using the point of view selector 118; and
the locations of the scenes relative to the free roaming space 262 by adding scene icons 234, 236, 238 at relevant locations on the free roaming space 262.

The user is also able to define the observer experiences that occur at each scene and the locations of the experiences relative to the observer by selecting a scene 246, 248, 250 which causes the plate screen 150 to be displayed, as shown in FIGS. 8 and 9. If the user wishes to define observer experiences in 3D space, the user selects 3D sphere in the experience model selector 174 which causes the sphere screen 220 to be displayed as shown in FIG. 11.

Using either the plate screen 150 or the sphere screen 220, the user adds pins 158 to the relevant plate area 152 or spherical space 222 at locations relative to the observer 156 that correspond to the desired locations of the desired observer experiences at a defined time indicated by a time marker 186, and the user selects the type of user experiences corresponding to each pin 158 using the add pin window 190.

Subsequent observer experiences in the scene occurring at a later time can be added by selecting a different time on the time line 184 and adding pins 158 to a further plate area 152 or spherical space 222 at locations relative to the observer 156 that correspond to the desired locations of the desired observer experiences at the different time.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are determined to be within the scope of the present invention.

What is claimed is:
1. A media content planning system comprising:
a data storage device arranged to store information indicative of scenes of a media content project;
a user interface arranged to:
display scene indicia indicative of locations of scenes of a media content project and/or respective timings of occurrence of the scenes of the media content project;
enable a user to select an experience space for display, the experience space associated with a defined time and including a representation of an observer;

display an experience location screen for the experience space;
enable the user to select at least one experience icon indicative of an observer experience associated with a scene;
enable the user to select a location on the experience space at which to dispose each experience icon, and to display each experience icon on the experience location screen for the experience space at the respective selected location in response to selection of a location on the experience space for each experience icon, each selected location representative of a desired location in at least 2 dimensional space relative to the observer of the observer experience in the scene at the defined time;
enable the user to select at least one further experience space for display, each further experience space associated with a further defined time corresponding to a later time in the scene than the defined time;
display an experience location screen for the further experience space;
enable the user to select a further location on the further experience space at which to dispose an experience icon, and to display the experience icon on the experience location screen for the further experience space at the selected further location in response to selection of a further location on the further experience space, the selected further location representative of a desired further location in at least 2 dimensional space relative to the observer of the observer experience associated with the experience icon at the further defined time; and
the system arranged to store data indicative of:
the or each selected observer experience;
the scene associated with each observer experience, and
for each experience space, the selected location in at least 2 dimensional space relative to the observer of each observer experience relative to the observer.

2. A system as claimed in claim 1, wherein the system is arranged to display a world overview, the world overview comprising a world space including at least one scene icon indicative of at least one scene at a location on the world space representative of the desired location of the scene in the media content project.

3. A system as claimed in claim 2, wherein the world space is defined according to a computer-generated space mesh, the space mesh representing an actual real-world space.

4. A system as claimed in claim 2, wherein the system enables the user to add a scene icon to the world space at a location representative of the desired location of a scene in the media content project, and to enable the user to select at least one observer experience for association with the scene icon.

5. A system as claimed in claim 1, wherein the system enables the user to select a type of observer experience associated with the experience icon.

6. A system as claimed in claim 1, wherein the displayed experience location screen for the experience space comprises at least one annular or spherical portion surrounding the representation of the observer, the annular or spherical portion usable by the user to add an experience icon to the experience space at a location around the observer representative of the desired location around the observer of the observer experience in the scene.

7. A system as claimed in claim 1, wherein the system is arranged to enable the user to:
create a plurality of characters; and
create observer experience data for each character.

8. A system as claimed in claim 1, wherein the observer experience includes any one or more of a haptic experience, a visual experience and/or an audio experience.

9. A method of planning media content, the method comprising:
storing information indicative of scenes of a media content project;
displaying scene indicia indicative of locations of scenes of the media content project and/or respective timings of occurrence of the scenes of the media content project;
enabling a user to select scene indicia representative of a scene;
enabling the user to select an experience space for display, the experience space associated with a defined time and including a representation of an observer;
displaying an experience location screen for the experience space;
enabling the user to select at least one experience icon indicative of an observer experience associated with the scene;
enabling the user to select a location on the experience space at which to dispose each experience icon, and to display each experience icon on the experience location screen for the experience space at the respective selected location in response to selection of a location on the experience space for each experience icon, each selected location representative of a desired location in at least 2 dimensional space relative to the observer of the observer experience in the scene at the defined time;
enabling the user to select at least one further experience space for display, each further experience space associated with a further defined time corresponding to a later time in the scene than the defined time;
displaying an experience location screen for the further experience space;
enabling the user to select a further location on the further experience space at which to dispose an experience icon, and to display the experience icon on the experience location screen for the further experience space at the selected further location in response to selection of a location on the further experience space, the selected location representative of a desired further location in at least 2 dimensional space relative to the observer of the observer experience associated with the experience icon at the further defined time; and
storing data indicative of:
the or each selected observer experience;
the scene associated with each observer experience, and
for each experience space, the selected location in at least 2 dimensional space relative to the observer of each observer experience relative to the observer.

10. A method as claimed in claim 9, comprising enabling the user to add a scene icon to a world space at a location representative of the desired location of a scene in the media content project, and enabling the user to select at least one observer experience for association with the scene icon.

11. A method as claimed in claim 9, comprising enabling the user to select a type of observer experience associated with the experience icon.

12. A method as claimed in claim 9, wherein the displayed experience location screen for the experience space comprises at least one annular portion surrounding the representation of the observer, the annular portion usable by the user to add an experience icon to the experience space at a location in 2 dimensional space around the observer representative of the desired location in at least 2 dimensional space around the observer of the observer experience in the scene.

13. A user interface for a system for planning media content, the user interface arranged to:
   display scene indicia indicative of locations of scenes of a media content project and/or respective timings of occurrence of the scenes of the media content project;
   enable a user to select an experience space for display, the experience space associated with a defined time and including a representation of an observer;
   display an experience location screen for the experience space;
   enable the user to select at least one experience icon indicative of an observer experience associated with a scene; and
   enable the user to select a location on the experience space at which to dispose each experience icon, and to display each experience icon on the experience location screen for the experience space at the respective selected location in response to selection of a location on the experience space for each experience icon, each selected location representative of a desired location in at least 2 dimensional space relative to the observer of the observer experience in the scene at the defined time;
   enable the user to select at least one further experience space for display, each further experience space associated with a further defined time corresponding to a later time in the scene than the defined time;
   display an experience location screen for the further experience space; and
   enable the user to select a further location on the further experience space at which to dispose an experience icon, and to display each experience icon on the experience location screen for the further experience space at the respective selected further location in response to selection of a further location on the experience space for each experience icon, the selected further location representative of a desired further location in at least 2 dimensional space relative to the observer of the observer experience associated with the experience icon at the further defined time.

14. A user interface as claimed in claim 13, wherein a world space is defined according to a computer-generated space mesh, the space mesh representing an actual real-world space.

15. A user interface as claimed in claim 13, wherein the experience space comprises at least one annular or spherical portion surrounding the representation of the observer, the annular or spherical portion usable by the user to add an experience icon to the experience space at a location around the observer representative of the desired location around the observer of the observer experience in the scene.

16. A media content planning system comprising:
   a data storage device arranged to store information indicative of scenes of a media content project;
   the system arranged to communicate information to a user interface device for display at the user interface device, the information indicative of:
      scene indicia indicative of locations of scenes of a media content project and/or respective timings of occurrence of the scenes of the media content project;
      an experience space associated with a scene and including an experience location screen for the experience space to display including a representation of an observer, the experience space associated with a defined time; and
      at least one experience icon in the experience space, each experience icon indicative of a location in at least 2 dimensional space relative to an observer of an observer experience, the location of each experience icon in the experience space being representative of a desired location in 2 dimensional space relative to the observer of the observer experience in the scene;
   the system arranged to receive information indicative of selection by a user of the experience space associated with the defined time, to receive information indicative of selection by the user of the observer experience to be associated with the scene, and to receive information indicative of a selection by the user of a location on the experience space at which to dispose an experience icon associated with the observer experience in at least 2 dimensional space relative to the observer, wherein in response to selection of a location on the experience space for each experience icon, the system is arranged to communicate to the user interface device information usable by the user interface device to display each experience icon on the experience location screen for the experience space at the respective selected location;
   the system arranged to receive information indicative of selection by a user of at least one further experience space associated with a further defined time corresponding to a later time in the scene than the defined time, and to receive information indicative of selection by the user of a further location on the experience space at which to dispose the experience icon associated with the observer experience in at least 2 dimensional space relative to the observer, wherein in response to selection of a further location on the experience space for the experience icon, the system is arranged to communicate to the user interface device information usable by the user interface device to display the experience icon on the experience location screen for the further experience space at the respective selected further location; and
   the system arranged to store data indicative of:
      the selected observer experience;
      the scene associated with each observer experience, and
      for each experience space, the selected location in at least 2 dimensional space relative to the observer of each observer experience relative to the observer.

17. A system as claimed in claim 16, wherein the system is arranged to receive information indicative of a selection by the user of a type of observer experience associated with the experience icon.

18. A project planning system comprising:
   a data storage device arranged to store information indicative of a project;
   a user interface arranged to:
      enable a user to select an experience space for display, the experience space associated with a defined time;
      display an experience location screen for the experience space;
      enable the user to select at least one experience icon indicative of an experience in the project;
      enable the user to select a location on the experience space at which to dispose each experience icon, and to display each experience icon on the experience location screen for the experience space at the respective selected location in response to selection of a location on the experience space for each experience icon, each selected location representative of a desired location in at least 2 dimensional space of an experience at the defined time;

enable the user to select at least one further experience space for display, each further experience space associated with a further defined time corresponding to a later time than the defined time;

display an experience location screen for the further experience space;

each further experience space enabling the user to select a further location on the further experience space at which to dispose an experience icon, and to display the experience icon on the experience location screen for the further experience space at the selected further location in response to selection of a further location on the further experience space, the selected further location representative of a desired further location in at least 2 dimensional space of the experience associated with the experience icon at the further defined time; and the system arranged to store data indicative of:
  the or each selected experience;
  a scene associated with each experience, and
  for each experience space, the selected location in at least 2 dimensional space of each experience.

19. A system as claimed in claim 18, wherein the experience space comprises at least one annular or spherical portion, the annular or spherical portion usable by the user to add an experience icon to the experience space at a location representative of the desired location of an observer experience in the scene.

* * * * *